US012806764B2

(12) United States Patent
Ganguly et al.

(10) Patent No.: US 12,806,764 B2
(45) Date of Patent: Nov. 24, 2026

(54) ROBOTIC SIMULATIONS USING MULTIPLE LEVELS OF FIDELITY

(71) Applicant: Intrinsic Innovation LLC, Mountain View, CA (US)

(72) Inventors: Shameek Ganguly, Milpitas, CA (US); Pavel Krajcevski, San Francisco, CA (US); Xiaojun Ma, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 225 days.

(21) Appl. No.: 18/221,256

(22) Filed: Jul. 12, 2023

(65) Prior Publication Data

US 2024/0025035 A1 Jan. 25, 2024

Related U.S. Application Data

(60) Provisional application No. 63/390,777, filed on Jul. 20, 2022.

(51) Int. Cl.
*B25J 9/16* (2006.01)

(52) U.S. Cl.
CPC .................................. *B25J 9/1605* (2013.01)

(58) Field of Classification Search
None
See application file for complete search history.

(56) References Cited

U.S. PATENT DOCUMENTS

| | | | | |
|---|---|---|---|---|
| 11,475,183 | B1 * | 10/2022 | Roggendorf | G06F 30/20 |
| 2019/0219972 | A1 * | 7/2019 | Gray | G05D 1/0011 |
| 2022/0184802 | A1 * | 6/2022 | Rinke | B25J 9/1669 |

* cited by examiner

*Primary Examiner* — Jason Holloway
*Assistant Examiner* — Atticus A Cameron
(74) *Attorney, Agent, or Firm* — Fish & Richardson P.C.

(57) ABSTRACT

In one aspect, there is provided a computer-implemented method that includes: obtaining, by a robotic simulator, data representing a physical robotic operating environment having a physical robot therein, setting a first level of physical simulation fidelity that disables one or more simulation features of the robotic simulator, receiving a user specification of a task to be performed by the physical robot, executing a simulation of the task being performed by a virtual robot representing the physical robot in a virtual robotic operating environment at the first level of physical simulation fidelity, determining that the task succeeded at the first level of physical simulation fidelity, in response to the determining, enabling one or more of the disabled simulation features, and performing a rerun of the simulation of the task with the one or more of the disabled simulation features enabled.

20 Claims, 4 Drawing Sheets

ROBOTIC SIMULATIONS USING MULTIPLE LEVELS OF FIDELITY

CROSS-REFERENCE TO RELATED APPLICATIONS

This application claims priority to U.S. Provisional Application No. 63/390,777, filed on Jul. 20, 2022. The disclosure of the prior application is considered part of and is incorporated by reference in the disclosure of this application.

BACKGROUND

This specification relates generally to robotics. More specifically, this specification relates to methods and systems for performing robotics simulations.

Industrial manufacturing heavily relies on robotics for automation. As the complexity of automated manufacturing processes have increased over time, so has the demand for robotic systems capable of high precision and excellent performance. This, in turn, prompted attempts to use off-line programming and simulation tools to improve the performance of robotic systems on the manufacturing floor. Simulators allow robotic process designers to test out plans and workcell arrangements without incurring the time or labor cost of running on physical hardware.

However, as robotic capabilities get more sophisticated, the complexity of a simulator needed to sufficiently represent robotic tasks likewise increases. In many cases, a full physical simulation engine is needed in order to accurately represent how workpieces and other objects in a workcell react to robotic manipulation. As another example, detailed texture mapped renderings might be required in order to accurately simulate how a sensor would view objects in a workcell.

But when setting up simulators of a robotic process require elaborate and detailed simulation capabilities, the simulators begin to lose their appeal and efficiency advantages. In other words, as robotic capabilities become more sophisticated, simulators tend to more greatly hinder the design process than aid it.

SUMMARY

This specification describes methods and systems for performing robotics simulations at multiple levels of fidelity.

According to a first aspect, there is provided a computer-implemented method that includes: obtaining, by a robotic simulator, data representing a physical robotic operating environment having a physical robot therein, setting a first level of physical simulation fidelity that disables one or more simulation features of the robotic simulator, receiving a user specification of a task to be performed by the physical robot, executing a simulation of the task being performed by a virtual robot representing the physical robot in a virtual robotic operating environment at the first level of physical simulation fidelity, determining that the task succeeded at the first level of physical simulation fidelity, in response to the determining, enabling one or more of the disabled simulation features, and performing a rerun of the simulation of the task with the one or more of the disabled simulation features enabled. For example, the method can perform the rerun of the simulation with the one or more disabled simulation features enabled on a per-component basis.

Particular embodiments of the subject matter described in this specification can be implemented so as to realize one or more of the following advantages.

In robotic applications that have been built, a large portion of time is spent creating high-level sequences, determining reachability, and creating poses for robots to go to. Most calibration and closed-loop behavior, tactile, and force-based tuning, can be performed on the physical workcell. In some cases, it may be desirable to devote more time on tuning the physical workcell, instead of making physics-based simulation work. The systems and methods described in this specification can allow a user to opt-into a physics-based simulation when desirable, and opt-out of the physics-based simulation if tuning the physical workcell is preferred, either on a per-run or a per-component basis.

The systems and methods described in this specification facilitate kinematics-only simulations that can validate that the robot moves as expected and that the commands are executed properly, before performing a full physical simulation. Accordingly, it is possible to accelerate the process of building robotic applications because simulation bugs can be picked up earlier on when less computationally-expensive simulations are performed.

Moreover, simulations of robotic processes usually involve multiple parts and components, some of which may benefit from full physics simulation, whereas others need only be modeled kinematically. Simulating these latter components with full physics can incur unnecessary modeling time and computational cost. The systems and methods described in this specification allow to overcome these drawbacks by ensuring that different components of robotic processes are simulated with appropriate levels of fidelity. In other words, the systems and methods can turn on, or off, full-physics and/or kinematic simulations on a per-component basis, thus allowing for high accuracy where needed while minimizing modeling burden and computational footprint.

The systems and methods described in this specification allow to quickly and efficiently mock up robotic applications using kinematics-only simulations. Full physics simulations can often result in multiple simulation bugs and can therefore be difficult to use when aiming to demonstrate and test a proof-of-concept robotic application. Accordingly, the systems and methods described in this specification allow to focus on high-level intent and sequence precisely when it is desirable to do so, instead of focusing on accurately representing physics and details in the simulations when they are not always necessary.

The systems and methods described in this specification enable easier interoperability between various third-party devices and the simulation. For example, most end-effectors for robots tend to have simple kinematics (e.g. grip, poke, connect, etc.) while also having physical properties that are difficult to represent in simulations. The systems and methods described in this specification facilitate the use of any type of third-party device because integrating its properties into a simpler kinematics model is a lot easier than into a full physics simulation.

The systems and methods described in this specification can reduce consumption of computational resources, e.g., memory and computing power. For example, performing simulations using only kinematics simulation features (without, e.g., collision detection and response) can significantly reduce the amount of necessary compute enabling simulations that are from ten to one thousand times faster than simulations performed by other conventional systems. This can significantly speed up the process of robotic application design.

Furthermore, the methods and systems described in this specification can assign more computational resources to the areas of the simulation that require higher fidelity than the other areas of the simulation. As a particular example, if the robotic application design involves a robot placing an object into a container, then the methods and systems described in this specification can use a larger proportion of computational resources for simulating the gripper of the robot picking up the object, and a smaller proportion of computational resources for simulating the object falling inside the container. In other words, the methods and systems described in this specification can intelligently distribute computational resources according to desired levels of fidelity in different areas of the simulation, thereby improving the overall efficiency of the simulation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
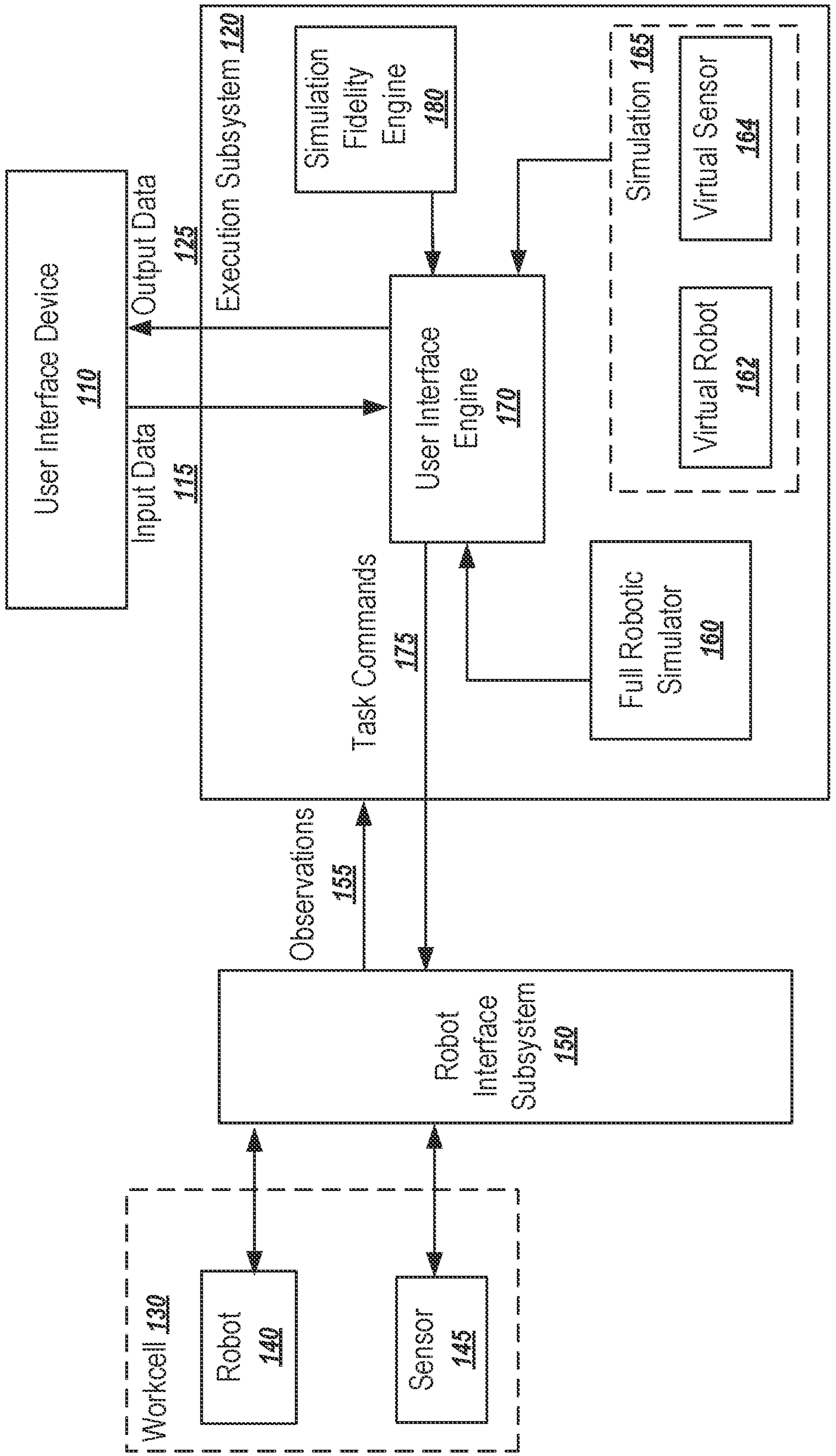
FIG. 1 is a block diagram of an example system for performing robotics simulations using multiple levels of fidelity.

FIG. 1 illustrates an example system 100 for performing robotics simulations using multiple levels of fidelity. The system 100 can be implemented as computer programs installed on one or more computers in one or more locations that are coupled to each other through any appropriate communications network, e.g., an intranet or the Internet, or a combination of networks.

The system 100 includes a physical operating environment 130 (e.g., a physical workcell) having a physical robot 140 and one or more sensors 145. As a particular example, the physical robot 140 can be a robotic arm, and the sensor 145 can be coupled to the robotic arm. The sensor 145 can be configured to obtain any type of measurement. In one example, the sensor 145 can be a force sensor positioned at the tip of the robot arm 140 (e.g., an end effector). In another example, the sensor 145 can be a torque sensor configured to measure the torque applied to one or more joints of the robot 140. Generally the physical operating environment 130 can include any appropriate number and type of physical robots 140 and sensors 145.

The system 100 further includes a robot interface subsystem 150 that acts as an interface between the workcell 130 and an execution subsystem 120. The robot interface subsystem 150 can receive observations 155 from the workcell 130, which can include, e.g., measurements obtained by the sensor 145, e.g., visual data obtained by a camera positioned in the workcell 130. The robot interface subsystem 150 can use the observations 155 to control the physical robot 140 and/or the sensor 145 in the workcell 130.

For example, the execution subsystem 120 can process the observations 155 and generate task commands 175 for controlling the robot 140 (e.g., for controlling the movement of the robot 140), and provide the commands 175 to the robot 140 through the robot interface subsystem 150. The task commands 175 can be programs that instruct the robot 140 to perform a task, e.g., to move from a first position to a second position, adopt a new kinematic configuration of the one or more joints, pick-up an object in the workcell 130, perform a measurement with the sensor 145, or to perform any other appropriate task.

In some implementations, the task commands 175 can be provided by a user through a user interface device 110, which can be any appropriate stationary or mobile computing device, such as a desktop computer, a workstation in a robot factory, a tablet, a smartphone, or a smartwatch. For example, a user can interact with the user interface device 110 to generate input data 115 that can include a request for the physical robot 140 to perform a task in the workcell 130. The execution subsystem 120 can process the input data 115 to generate a corresponding task command 175, and provide the task command to the robot 140 in the workcell 130 through the robot interface subsystem 150. In response to receiving the command, the robot 140 can perform the task in the workcell 130. The system 100 can monitor the robot's progress at performing the task in the workcell 130 by obtaining measurements using the sensor 145 and providing the measurements to the execution subsystem 120 as observations 155.

The execution subsystem 170 can generate output data 125 and provide it to the user interface device 110 that can present the output data 125 in a graphical user interface. For example, the execution subsystem 170 can generate output data 125 based on the observations 155 (e.g., force, kinematic configuration, pose, location measurements, or any other appropriate measurements obtained by the sensor 145). A user of the system 100 can view the output data 125 through the user interface device 110.

The execution subsystem 120 can further include a robotic simulator 160 that can generate a simulation 165 of a virtual robot 162 (and/or a virtual sensor 164) in a virtual operating environment. Throughout this specification a "virtual operating environment" refers to a virtual simulation of the physical operating environment. The virtual robot 162 in the virtual operating environment can emulate the physical robot 140 in the physical operating environment 130. The simulation 165 can be, e.g., a CAD model, or any other appropriate type of model. In some implementations, the robotic simulator 160 can generate the simulation 165 where the virtual robot 162 performs a particular task, e.g., picks up an object.

The user interface engine 170 can present the simulation 165 to a user through the user interface device 110. The user can observe the simulation 165 and determine whether the task has been performed successfully by the virtual robot 162. In some implementations, the execution subsystem 120 can automatically determine whether the task has been performed successfully by the virtual robot 162. For example, the execution subsystem 120 can determine a performance measure that characterizes the performance of the virtual robot 162. If the performance measure is above a threshold (e.g., above 50%, 60%, 70%, or 80% success rate), the execution subsystem 120 can determine that the task has been performed successfully. If the performance measure is below the threshold, the execution subsystem 120 can present an indication to a user through the user interface device 110 that the task has been performed unsuccessfully and, optionally, a prompt to change the level of physical simulation fidelity. Generally, the determination of whether the task has been performed successfully by the virtual robot 162 can be implemented in any appropriate manner.

If the task has been performed successfully, the user can provide input data 115 by interacting with the user interface device 110, the input data 115 indicating that it is desirable to perform the task in the physical workcell 130 using the physical robot 140. The execution subsystem 120 can translate the input data 115 into a corresponding task command 175 and provide it to the robot 140 through the robot interface subsystem 150. In response, the robot 140 can perform the task in the workcell 130. In some implementations, the robotic simulator 160 can accept commands sent to the robot programming interface directly, e.g., without user input.

The robotic simulator 160 can include one or more simulation features. Each of the simulation features can implement a different physical aspect of a real-world environment in the simulation 165. When all simulation features are enabled, the robotic simulator 160 can be referred to as a full robotic simulator and therefore simulate the virtual workcell to a highest degree of parity, or realism, with the physical workcell 130. A few examples of simulation features are described below.

In one example, the simulation features can include a collision detection feature that implements, e.g., collision geometry for each virtual entity (e.g., virtual robot, virtual object, and/or virtual sensor) in the simulation 165. In another example, the simulation features can include a gravitational force feature that implements, e.g., a mass of each of the virtual entities in the simulation 165. In yet another example, the simulation features can include a frictional force feature that implements, e.g., material properties of each of the virtual entities in the simulation 165. In yet another example, the simulation features can include a rigid body dynamics feature that implements, e.g., dynamical features of virtual entities in the simulation 165. Although a number of simulation features are described above, generally, the robotic simulator 160 can include any number of simulation features of any type.

The execution subsystem 120 can further include a simulation fidelity engine 180 that can define, and switch between, different levels of physical simulation fidelity of the simulation 165. A particular level of physical simulation fidelity can specify one or more simulation features of the robotic simulator 160 that are disabled, with the remaining simulation features being enabled. For example, a first level of physical simulation fidelity may specify that the kinematics simulation feature is enabled, with all remaining simulation features being disabled. As another example, a second level of physical simulation fidelity may specify that the kinematics simulation feature and the collision detection simulation feature are enabled, with the remaining features being disabled. The highest level of physical simulation fidelity may be implemented by a full robotic simulator, e.g., by the robotic simulator 160 having all simulation features enabled. In some implementations, the simulation features can be enabled, or disabled, on a per-components basis. For example, some components of the robotic process can be simulated with one or more simulation features enabled, while the other components of the robotic process can be simulated with the one or more simulation features (e.g., the same simulation features) disabled.

A user of the user interface device 110 can interact with one or more controls of the device 110 to set a first level of physical simulation fidelity of the simulation 165. The execution subsystem 120 can receive the user input and provide it to the simulation fidelity engine 180 that can, in turn, disable one or more features of the robotic simulator 160 in accordance with the first level of physical simulation fidelity selected by the user. The robotic simulator 160 can execute the simulation 165 of a task being performed by the virtual robot 162 at the first level of the physical simulation fidelity. In some implementations, the task being simulated can also be specified by the user through user input, e.g., the user can specify that the task to be performed is for the virtual robot 162 to pick up a virtual object. In some implementations, the robotic simulator 160 can automatically enable, or disable, one or more simulation features for certain components of the robotic process. For example, the simulator 160 can enable, or disable, simulation features based on a proximity of one or more components to a designated component in the robotic process in the workcell, e.g., based on the proximity of one or more components to a robotic arm.

The user can view the simulation 165 through the user interface device 110 and determine whether the task has been performed successfully by the virtual robot 162 in the simulation 165, e.g., whether the virtual robot 162 has successfully picked up the virtual object. The user can interact with the user interface device 110 to provide an indication that the task has been performed successfully. In response to the user input, the simulation fidelity engine 180 can switch the level of simulation fidelity by enabling one or more simulation features of the robotic simulator 160 that were previously disabled. For example, if at the first level of fidelity only the kinematics simulation feature was enabled, the simulation fidelity engine 180 can additionally enable the collision detection simulation feature. The robotic simulator 160 can perform a rerun of the simulation 165 with the one or more disabled simulation features enabled.

Figure 4:
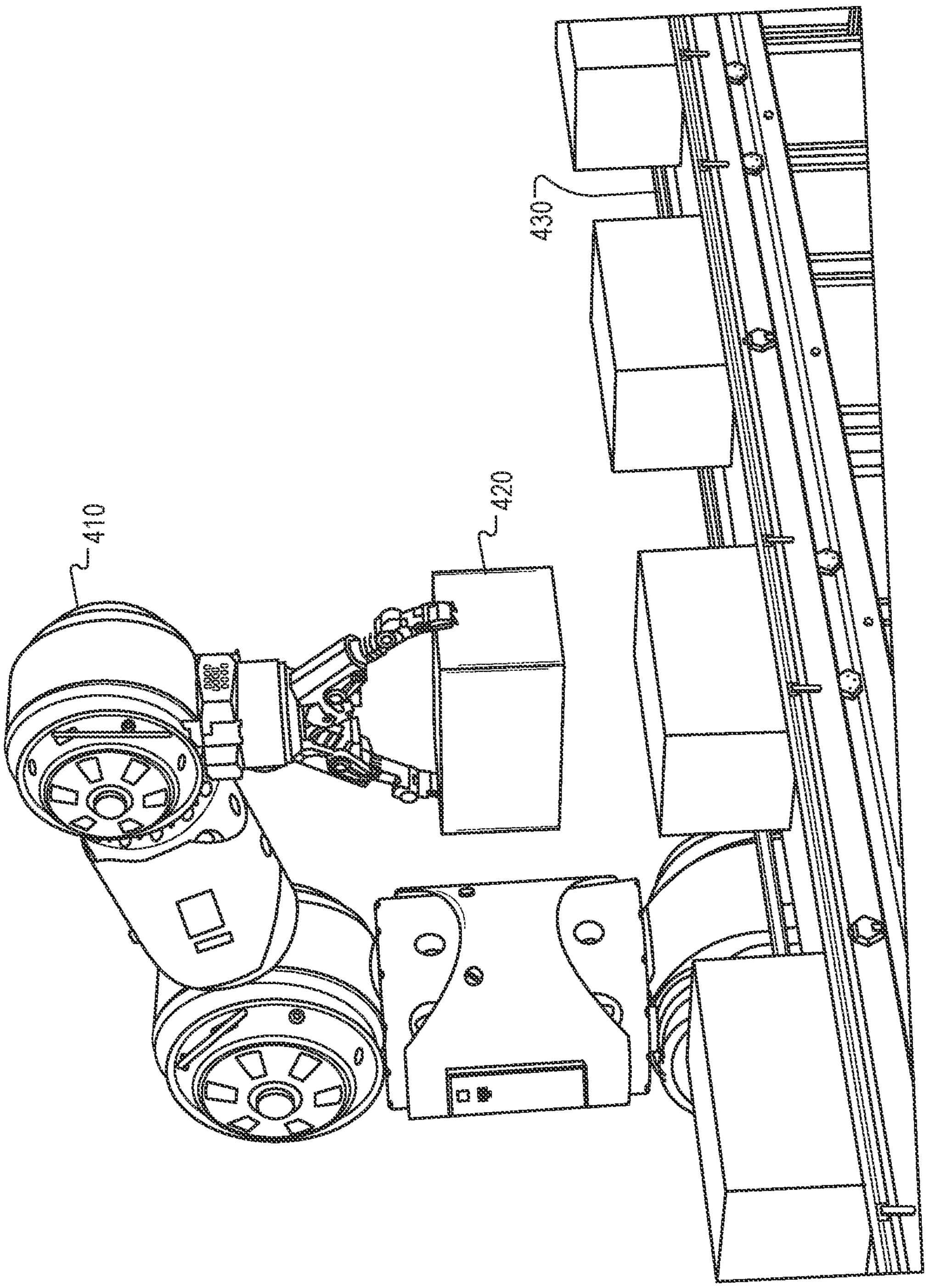
FIG. 4 illustrates an example physical robotic operating environment that can be simulated using the example system shown in FIG. 1.

As a particular example, as illustrated in FIG. 4, the robot can be a robotic arm 410 that can be configured to pick up an object 420 from a moving conveyor belt 430. At an initial stage of robotic application design, it may only be desirable to determine whether the robotic arm 410 is able to approach the object 420 close enough such that it could then pick up the object 420 from the conveyor belt 430. Therefore, at the first level of physical simulation fidelity, the system can enable only the kinematics simulation feature of the simulator, and run the simulation with the remaining simulation features disabled.

After determining that the task has been performed successfully at the first level of physical simulation fidelity, the system can proceed to the next stage of robotic application design and enable one or more simulation features of the simulator that have been disabled previously. For example, the system can enable the collision detection simulation feature. With this feature enabled, the initial path of the robotic arm 410 (e.g., path determined at the first stage) in the simulation may need to be redesigned in order to avoid the robotic arm 410 colliding with the objects 420 on the conveyor belt 430.

In some implementations, instead of enabling one or more simulation features, the engine 180 can instead disable one or more simulation features. In some implementations, the engine 180 can disable one simulation feature and instead enable a different simulation feature. Generally, the engine 180 can change the level of physical simulation fidelity in any appropriate manner by enabling/disabling any appropriate number of simulation features.

After determining the task succeeded at any level of physical simulation fidelity, the execution subsystem 120 can generate a prompt asking whether the task should be performed by the physical robot 140 in the physical workcell 130. The prompt can be presented on the user interface device 110 (e.g., a window with text asking if the task should be performed, and "yes"/"no" buttons). A user can interact with the user interface device 110 by e.g., clicking on the "yes" button, which can be received as input data 115 by the execution subsystem 120. In response, the execution subsystem 120 can generate task commands 175, send the commands 175 to the physical robot 140 via the robot interface subsystem 150, and cause the robot 140 to perform the task in the workcell 130.

Accordingly, the system described in this specification can adaptively perform simulations at multiple different levels of fidelity that can be chosen with specific robotic applications in mind and in line with available workcell data. In some implementations, the system can intelligently automatically determine the required level of simulation fidelity. This can significantly reduce the amount of required computational resources and speed up the process of robotic application design.

Figure 2:
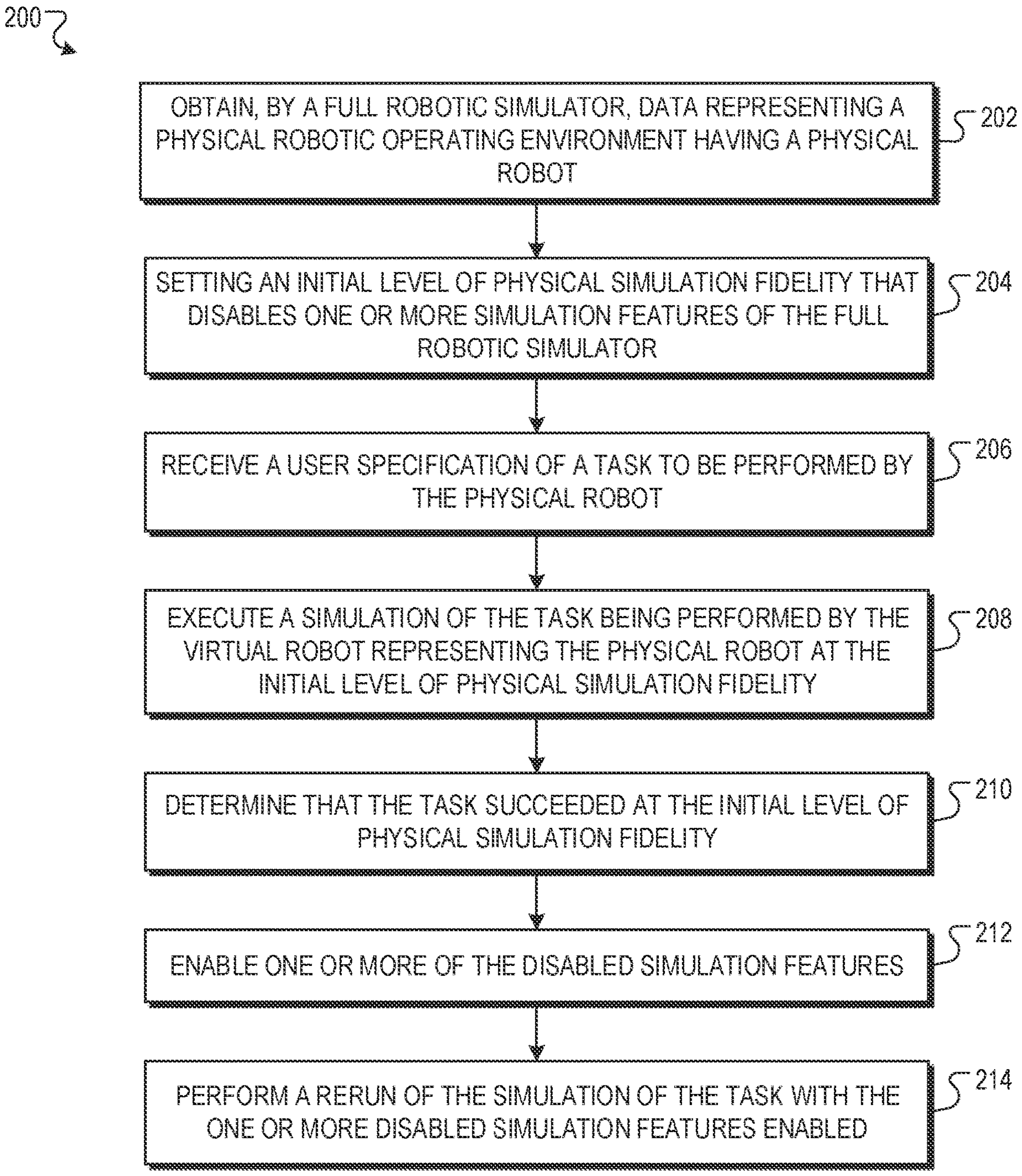
FIG. 2 is a flow diagram of an example process for performing robotics simulations using multiple levels of fidelity.

FIG. 2 is a flow diagram of an example process 200 for performing robotics simulations using multiple levels of fidelity. For convenience, the process 200 will be described as being performed by a system of one or more computers located in one or more locations. For example, a system for performing robotics simulations using multiple levels of fidelity, e.g., the system 100 in FIG. 1, appropriately programmed, can perform the process 200.

The system obtains, by a robotic simulator, data representing a physical robotic operating environment having a physical robot therein (202). For example, a user can provide an input through a user interface device of the system that indicates, e.g., a position of a physical robot within the physical operating environment, or any other data. In some implementations, the system can obtain one or more physical sensor measurements of the physical robotic operating environment. The physical sensor measurements can characterize, for example, kinematics, collision, rigid body dynamics, physical composition, and/or material properties, of one or more physical objects in the physical robotic operating environment.

The system sets a first level of physical simulation fidelity that disables one or more simulation features of the robotic simulator (204). As described above with reference to FIG. 1, the system can, for example, select the level of simulation fidelity that has the kinematics simulation feature enabled, while all other simulation features are disabled. In some implementations, the system can automatically set the first level of physical simulation fidelity that disables the one or more simulation features of the robotic simulator. As a particular example, the system can automatically set the lowest level as the first level, e.g., the level having only one simulation feature enabled, with the remaining simulation features being disabled. The simulation features can include one or more of: a collision detection feature, a gravitational force feature, a frictional force feature, a rigid body dynamics feature, or any other appropriate feature.

In some implementations, the system can set the first level of physical simulation fidelity through user input. For example, the system can present, within a user interface, one or more user interface controls, each user interface control indicating a different level of physical fidelity of the simulation. Then, the system can receive, through the user interface, a user input corresponding to user interaction with the one or more user interface controls, the user input representing the first level of physical simulation fidelity.

In implementations where the system obtains one or more physical sensor measurements of the physical robotic operating environment, the system can set the first level of physical simulation fidelity based on these measurements. For example, the measurements can include mass of one or more physical objects in the physical operating environment. Based on the measurements of mass, the system can determine that the gravitational force simulation feature of the system can be enabled.

The system receives a user specification of a task to be performed by the physical robot (206). For example, the system can receive an input from a user, through a user interface device, specifying the task to be performed by the physical robot, e.g., to pick up an object, move to a different location, or any other appropriate task.

The system executes a simulation of the task being performed by a virtual robot representing the physical robot in a virtual robotic operating environment at the first level of physical simulation fidelity (208). As described above, the first level of physical simulation fidelity can disable one or more simulation features. In some implementations, the system can disable one or more simulation features for only a portion of the virtual robotic operating environment that represents the physical robotic operating environment.

The system determines that the task succeeded at the first level of physical simulation fidelity (210). For example, the system can compute a performance measure that indicates whether the task has been performed successfully. In one example, the performance measure can be binary determination of the task being performed successfully or not. In another example, the performance measure can specify percentage accuracy for the task. If percentage accuracy is above a threshold, the system can determine that the task has been performed successfully. If percentage accuracy is below the threshold, the system can determine that the task has not been performed successfully. In such cases, the system can set a new, different, first level of physical simulation fidelity, e.g., by enabling one or more simulation features, and rerun the simulation of the task.

The system enables, in response to the determining, one or more of the disabled simulation features (212). As a particular example, a user of the system can design a robotic application process and use the system to execute a simulation of the process at the first level of physical simulation fidelity. The user can determine that the simulation has succeeded, e.g., the robot successfully performed in the task. Then, the system can automatically enable, in response to the determining, one or more of the disabled simulation features. In some implementations, a user of the system can manually enable one or more simulation features. For example, the system can enable the simulation feature of frictional forces, such that the forces can be represented in the simulation. This can be in contrast to the first level of physical simulation fidelity, where the simulation feature of frictional forces might have been disabled.

The system performs a rerun of the simulation of the task with the one or more of the disabled simulation features enabled (214). For example, as described above with reference to FIG. 1, the system can perform the simulation again with additional simulation features enabled.

In some implementations, the system can further trigger the physical robot to perform the task in the physical operating environment. For example, the system can determine that the rerun of the simulation of the task with the one or more of the disabled simulation features enabled succeeded. The system can present, within a user interface, a prompt to perform the task in the physical operating environment. Then, the system can receive a user interaction with the prompt and, in response, cause the physical robot to perform the task in the physical operating environment.

Figure 3:
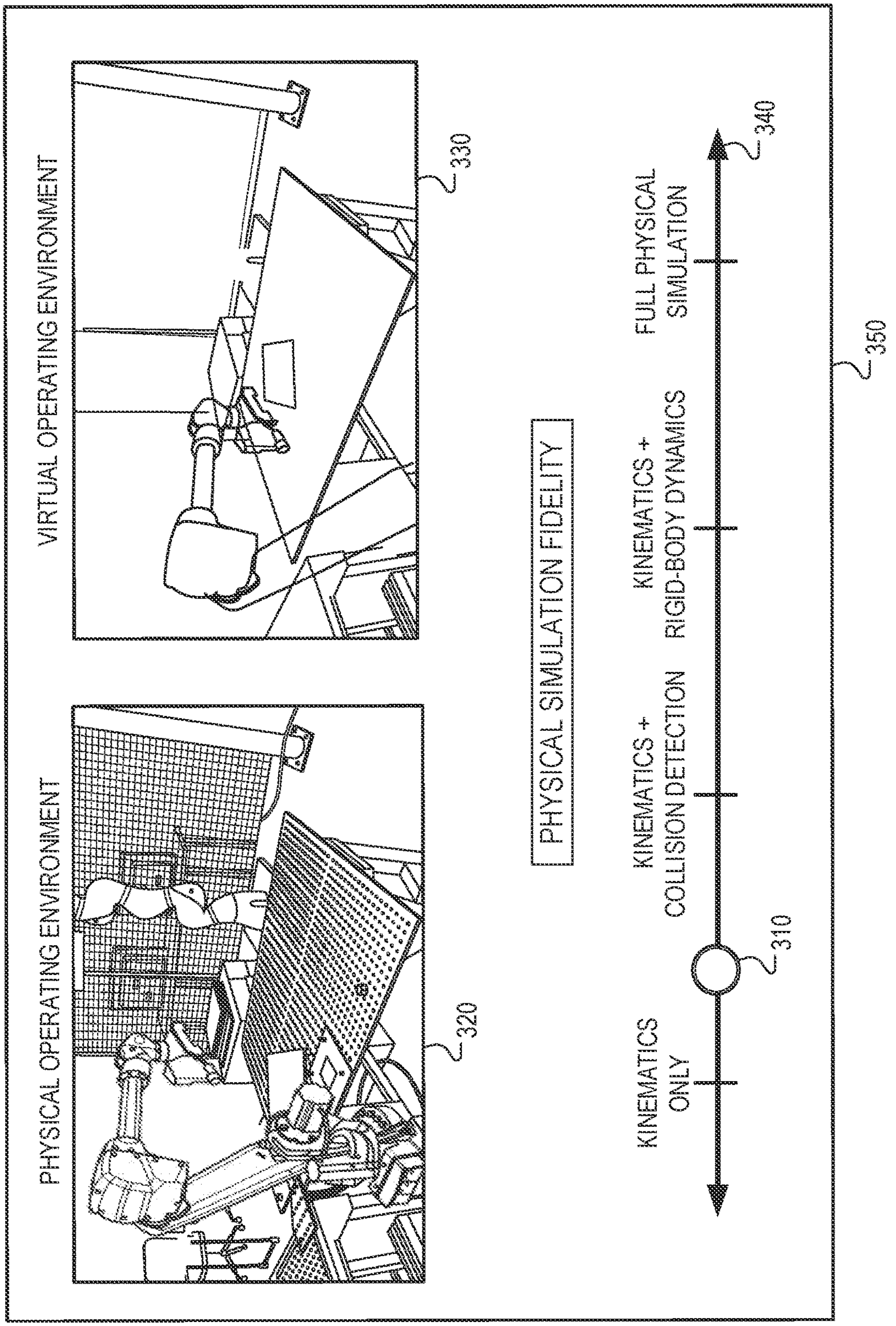
FIG. 3 is an example user interface of a system for performing robotics simulations using multiple levels of fidelity.

FIG. 3 is an example of user interface 350 of a system for performing robotics simulations using multiple levels of fidelity (e.g., the system 100 in FIG. 1). The user interface can include a view of physical operating environment 320 (e.g., workcell) that can be generated based on visual data obtained by one or more cameras positioned in the workcell. The user interface 350 can further include a view of virtual operating environment 330, e.g., a simulation generated by a robotic simulator.

As described above with reference to FIG. 1, a user can interact with interface controls 310 in the user interface 350 to select a first level of physical simulation fidelity. For example, the user can move the toggle 310 on the line 340 to indicate a desired level of simulation fidelity. In this example, the first level includes only the kinematics simulation feature, with the other simulation feature of the robotic simulator being disabled. The last level includes full physical simulation, e.g., a simulation performed by a full robotic simulator having all simulation features enabled.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
- obtaining, by a robotic simulator, data representing a physical robotic operating environment having a physical robot therein;
- setting a first level of physical simulation fidelity that disables one or more simulation features of the robotic simulator;
- receiving a user specification of a task to be performed by the physical robot;
- performing subsequent simulations of the task at increasing levels of physical simulation fidelity until a highest level of physical simulation fidelity is reached, including performing operations comprising:
  - executing a simulation of the task being performed by a virtual robot representing the physical robot in a virtual robotic operating environment at a current level of physical simulation fidelity,
  - determining whether the task succeeded at the current level of physical simulation fidelity;
  - whenever the task succeeded at the first level of physical simulation fidelity, increasing to a next level of physical simulation fidelity including enabling one or more of the disabled simulation features; and
  - whenever the task did not succeed at the current level of physical simulation fidelity, repeatedly performing operations comprising:
    - receiving an update to the task;
    - re-executing the simulation of the task at the current level of physical simulation fidelity using the update to the task, until the task succeeds at the current level of physical simulation fidelity.

2. The method of claim 1, wherein determining whether the task succeeded at the current level of physical simulation fidelity comprises:

determining a performance measure for the task at the current level of physical simulation fidelity; and determining that the performance measure is above a threshold.

3. The method of claim 1, wherein the virtual robotic operating environment comprises a simulation of the physical robotic operating environment.

4. The method of claim 1, wherein the data representing the physical robotic operating environment comprises measurements from one or more physical sensors in the physical robotic operating environment.

5. The method of claim 1, further comprising automatically setting the first level of physical simulation fidelity that disables the one or more simulation features of the robotic simulator.

6. The method of claim 1, wherein setting the first level of physical simulation fidelity that disables the one or more simulation features of the robotic simulator comprises:

disabling a collision detection simulation feature of the robotic simulator.

7. The method of claim 1, wherein setting the first level of physical simulation fidelity that disables the one or more simulation features of the robotic simulator comprises:

disabling a gravitational force simulation feature of the robotic simulator.

8. The method of claim 1, wherein setting the first level of physical simulation fidelity that disables the one or more simulation features of the robotic simulator comprises:

disabling a frictional force simulation feature of the robotic simulator.

9. The method of claim 1, wherein setting the first level of physical simulation fidelity that disables the one or more simulation features of the robotic simulator comprises:

disabling a rigid body dynamics simulation feature of the robotic simulator.

10. The method of claim 1, wherein setting the first level of physical simulation fidelity that disables the one or more simulation features of the robotic simulator comprises:

disabling the one or more simulation features for only a portion of the virtual robotic operating environment that represents the physical robotic operating environment.

11. The method of claim 1, setting the first level of physical simulation fidelity that disables the one or more simulation features of the robotic simulator comprises:

presenting, within a user interface, one or more user interface controls, each user interface control indicating a second level of physical simulation fidelity; and receiving, through the user interface, a user input corresponding to user interaction with the one or more user interface controls, the user input representing the first level of physical simulation fidelity.

12. The method of claim 1, further comprising:

determining that the simulation of the task at the highest level of physical simulation fidelity with the one or more of the disabled simulation features enabled succeeded;

presenting, within a user interface, a prompt to perform the task in the physical operating environment; and in response to receiving a user interaction with the prompt, causing the physical robot to perform the task in the physical operating environment.

13. The method of claim 1, wherein enabling the one or more of the disabled simulation features comprises:

enabling the one or more of the disabled simulation features of the robotic simulator for only one or more components of a plurality of components of the virtual robotic operating environment.

14. The method of claim 13, further comprising:

enabling the one or more of the disabled simulation features of the robotic simulator based on a proximity of the one or more components to a designated component of the virtual robotic operating environment.

15. The method of claim 1, wherein obtaining, by the robotic simulator, data representing the physical robotic operating environment having the physical robot comprises:

obtaining one or more physical sensor measurements of the physical robotic operating environment.

16. The method of claim 15, wherein setting the first level of physical simulation fidelity that disables one or more simulation features of the robotic simulator comprises:

setting the first level of physical simulation fidelity based on the one or more physical sensor measurements of the physical robotic operating environment.

17. The method of claim 15, wherein the one or more physical sensor measurements of the physical robotic operating environment characterize one or more of: kinematics, collision, rigid body dynamics, physical composition, and material properties, of one or more physical objects in the physical robotic operating environment.

18. A system comprising one or more computers, and one or more storage devices communicatively coupled to the one or more computers, wherein the one or more storage devices store instructions that, when executed by the one or more computers, cause the one or more computers to perform operations comprising:

obtaining, by a robotic simulator, data representing a physical robotic operating environment having a physical robot therein;

setting a first level of physical simulation fidelity that disables one or more simulation features of the robotic simulator;

receiving a user specification of a task to be performed by the physical robot;

performing subsequent simulations of the task at increasing levels of physical simulation fidelity until a highest level of physical simulation fidelity is reached, including performing operations comprising:

executing a simulation of the task being performed by a virtual robot representing the physical robot in a virtual robotic operating environment at a current level of physical simulation fidelity, determining whether the task succeeded at the current level of physical simulation fidelity;

whenever the task succeeded at the first level of physical simulation fidelity, increasing to a next level of physical simulation fidelity including enabling one or more of the disabled simulation features; and whenever the task did not succeed at the current level of physical simulation fidelity, repeatedly performing operations comprising:

receiving an update to the task;

re-executing the simulation of the task at the current level of physical simulation fidelity using the update to the task, until the task succeeds at the current level of physical simulation fidelity.

19. The system of claim 18, wherein determining whether the task succeeded at the current level of physical simulation fidelity comprises:

determining a performance measure for the task at the current level of physical simulation fidelity; and determining that the performance measure is above a threshold.

20. One or more non-transitory computer storage media storing instructions that, when executed by one or more computers, cause the one or more computers to perform operations comprising:

obtaining, by a robotic simulator, data representing a physical robotic operating environment having a physical robot therein;

setting a first level of physical simulation fidelity that disables one or more simulation features of the robotic simulator;

receiving a user specification of a task to be performed by the physical robot;

performing subsequent simulations of the task at increasing levels of physical simulation fidelity until a highest level of physical simulation fidelity is reached, including performing operations comprising:

executing a simulation of the task being performed by a virtual robot representing the physical robot in a virtual robotic operating environment at a current level of physical simulation fidelity, determining whether the task succeeded at the current level of physical simulation fidelity;

whenever the task succeeded at the first level of physical simulation fidelity, increasing to a next level of physical simulation fidelity including enabling one or more of the disabled simulation features; and whenever the task did not succeed at the current level of physical simulation fidelity, repeatedly performing operations comprising:

receiving an update to the task;

re-executing the simulation of the task at the current level of physical simulation fidelity using the update to the task, until the task succeeds at the current level of physical simulation fidelity.

* * * * *